(12) United States Patent  
Abron et al.

(10) Patent No.: US 10,205,856 B2  
(45) Date of Patent: Feb. 12, 2019

(54) VIDEO SURVEILLANCE SYSTEM

(71) Applicants: Robert Abron, Hayward, CA (US); Martha Abron, Hayward, CA (US)

(72) Inventors: Robert Abron, Hayward, CA (US); Martha Abron, Hayward, CA (US)

( * ) Notice: Subject to any disclaimer, the term of this patent is extended or adjusted under 35 U.S.C. 154(b) by 509 days.

(21) Appl. No.: 14/926,905

(22) Filed: Oct. 29, 2015

(65) Prior Publication Data

US 2017/0126934 A1     May 4, 2017

(51) Int. Cl.
| | |
|---|---|
| *H04N 5/225* | (2006.01) |
| *H04N 5/232* | (2006.01) |
| *H04N 7/18* | (2006.01) |
| *B60R 25/30* | (2013.01) |
| *G03B 17/00* | (2006.01) |

(52) U.S. Cl.
CPC ......... *H04N 5/2252* (2013.01); *B60R 25/305* (2013.01); *H04N 5/2257* (2013.01); *H04N 5/232* (2013.01); *H04N 7/183* (2013.01); *B60R 2300/00* (2013.01)

(58) Field of Classification Search
CPC ............. H04N 5/4403; H04N 5/23238; H04N 2005/4417; H04N 2005/443
See application file for complete search history.

(56) References Cited

U.S. PATENT DOCUMENTS

| | | | |
|---|---|---|---|
| 6,421,081 B1* | 7/2002 | Markus | ..................... B60R 1/00 340/436 |
| 6,795,111 B1 | 9/2004 | Mazzilli | |
| 7,064,657 B2 | 6/2006 | Becker et al. | |
| 7,091,833 B1 | 8/2006 | Davis | |
| 7,140,789 B1* | 11/2006 | Reinert | .................. F16M 11/08 396/428 |
| D649,175 S | 11/2011 | Willis | |
| D697,119 S | 1/2014 | Park et al. | |
| 8,854,465 B1 | 10/2014 | McIntyre | |
| 2003/0076415 A1 | 4/2003 | Strumolo | |
| 2006/0086871 A1* | 4/2006 | Joseph | ................. F16M 11/041 248/178.1 |
| 2007/0109107 A1 | 5/2007 | Liston | |
| 2007/0133979 A1* | 6/2007 | Lackey | ............... F16M 11/126 396/428 |
| 2011/0267186 A1 | 11/2011 | Rao et al. | |
| 2012/0288268 A1* | 11/2012 | Bevirt | .................... F16M 11/32 396/428 |
| 2013/0057396 A1 | 3/2013 | Winslow | |
| 2013/0233986 A1* | 9/2013 | Rasheta | ............... G03B 17/561 248/205.1 |
| 2014/0111646 A1* | 4/2014 | Hamilton, Sr. | .......... B60R 1/00 348/148 |
| 2014/0327773 A1* | 11/2014 | Scott-Cook | ...... G08B 13/19647 348/148 |

* cited by examiner

*Primary Examiner* — Howard D Brown, Jr.

(57) ABSTRACT

A video surveillance system includes a vehicle that has a dashboard. An electronic device is provided and the electronic device may be carried. A recording unit is positioned on the dashboard and the recording unit records video footage. The recording unit is in electrical communication with the electronic device such that the electronic device receives the video footage. Thus, the video footage may be remotely viewed. The recording unit rotates 360° such that the recording unit records the video footage of all sides of the vehicle.

9 Claims, 3 Drawing Sheets

VIDEO SURVEILLANCE SYSTEM

BACKGROUND OF THE DISCLOSURE

Field of the Disclosure

The disclosure relates to surveillance devices and more particularly pertains to a new surveillance device for recording video footage of a vehicle while the vehicle is unattended.

SUMMARY OF THE DISCLOSURE

An embodiment of the disclosure meets the needs presented above by generally comprising a vehicle that has a dashboard. An electronic device is provided and the electronic device may be carried. A recording unit is positioned on the dashboard and the recording unit records video footage. The recording unit is in electrical communication with the electronic device such that the electronic device receives the video footage. Thus, the video footage may be remotely viewed. The recording unit rotates 360° such that the recording unit records the video footage of all sides of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
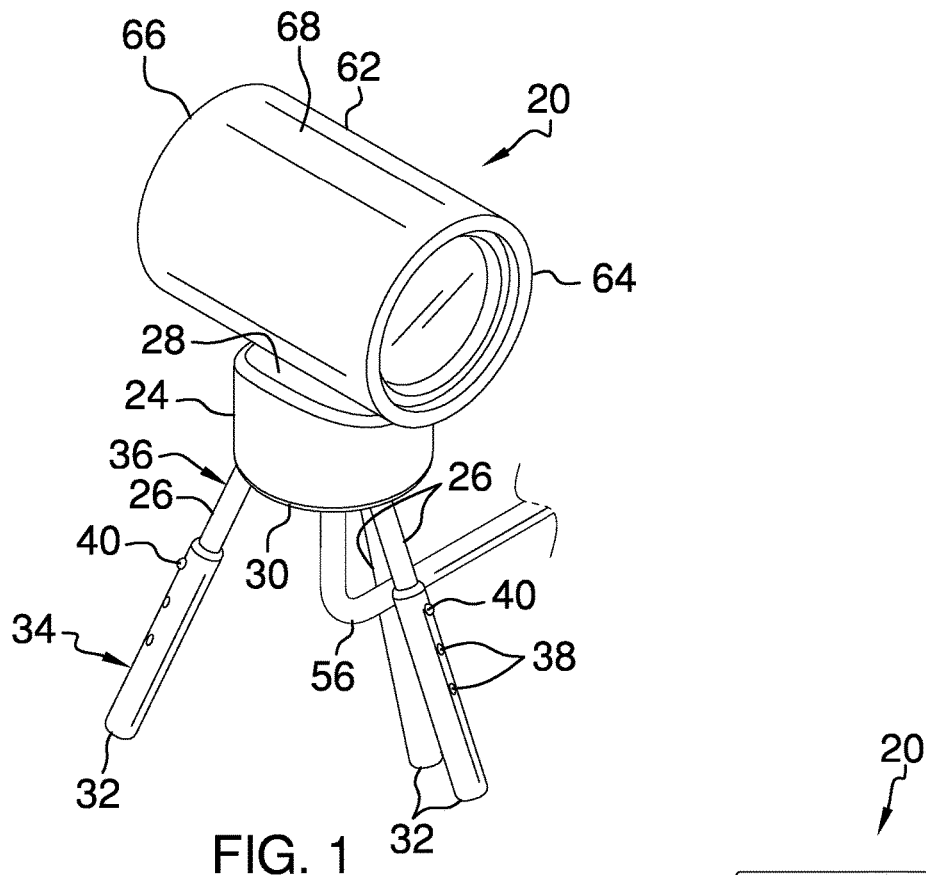
FIG. 1 is a top perspective view of a video surveillance system according to an embodiment of the disclosure.
Figure 2:
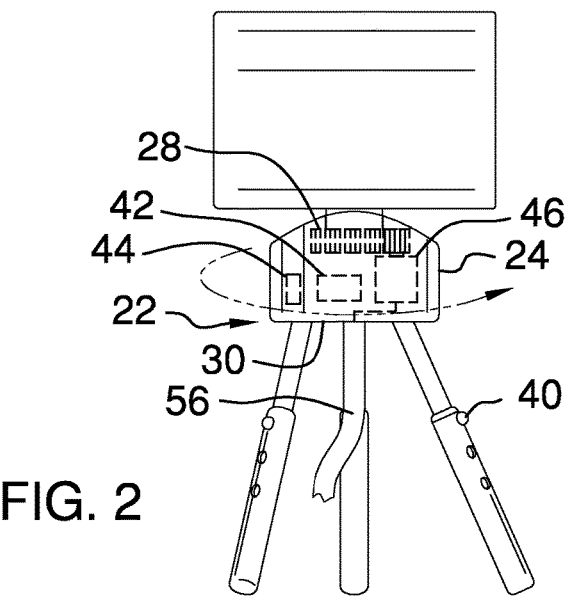
FIG. 2 is a right side view of an embodiment of the disclosure.
Figure 3:
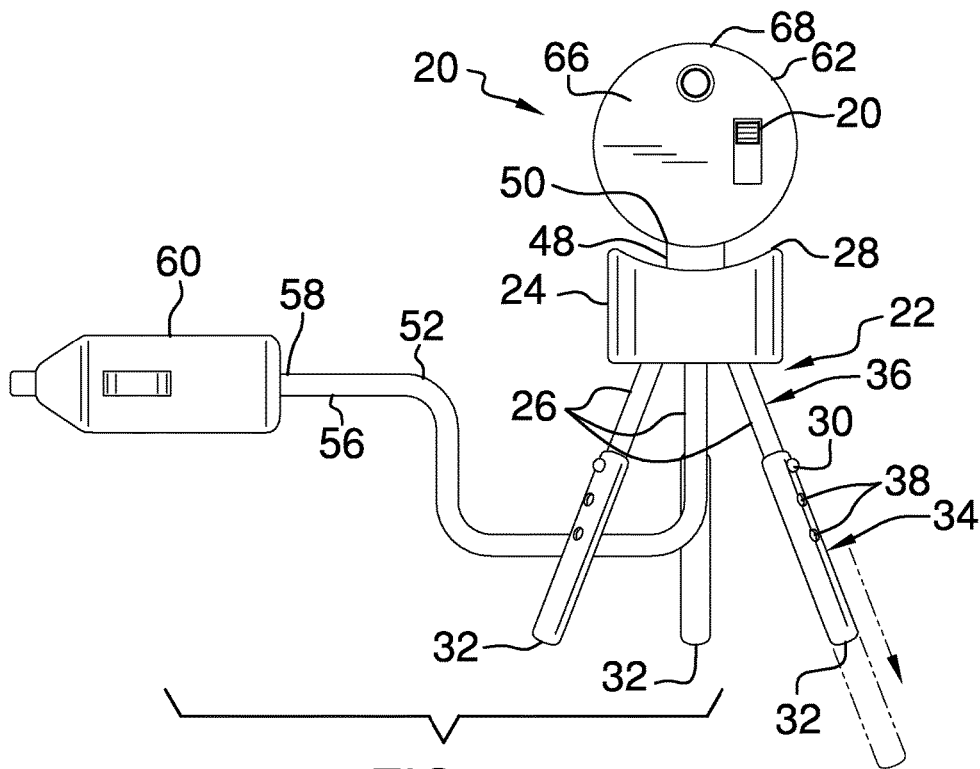
FIG. 3 is a back view of an embodiment of the disclosure.
Figure 4:
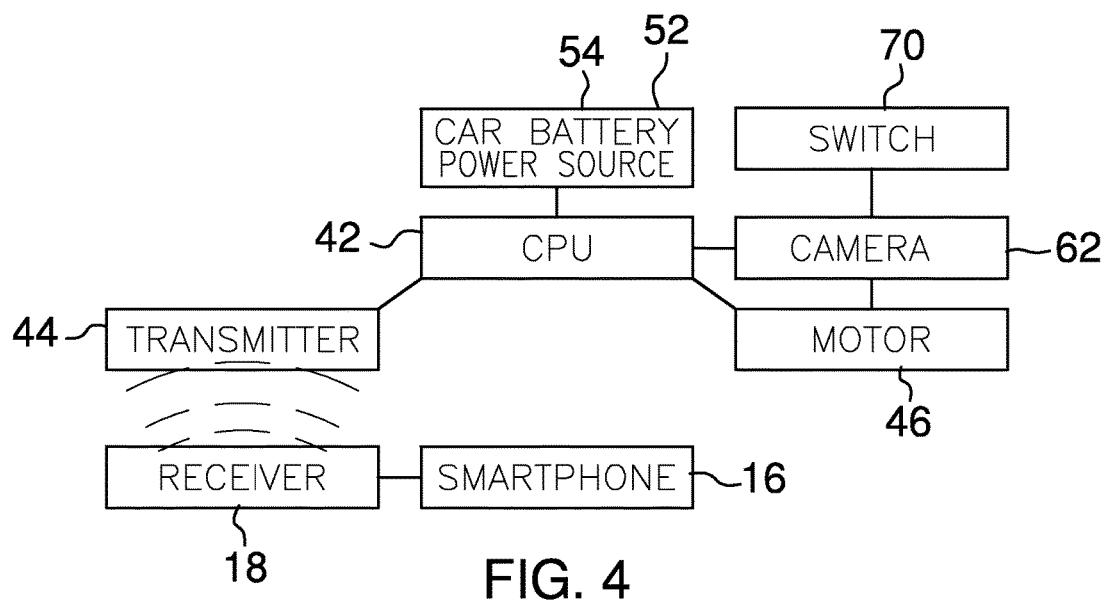
FIG. 4 is a schematic view of an embodiment of the disclosure.
Figure 5:
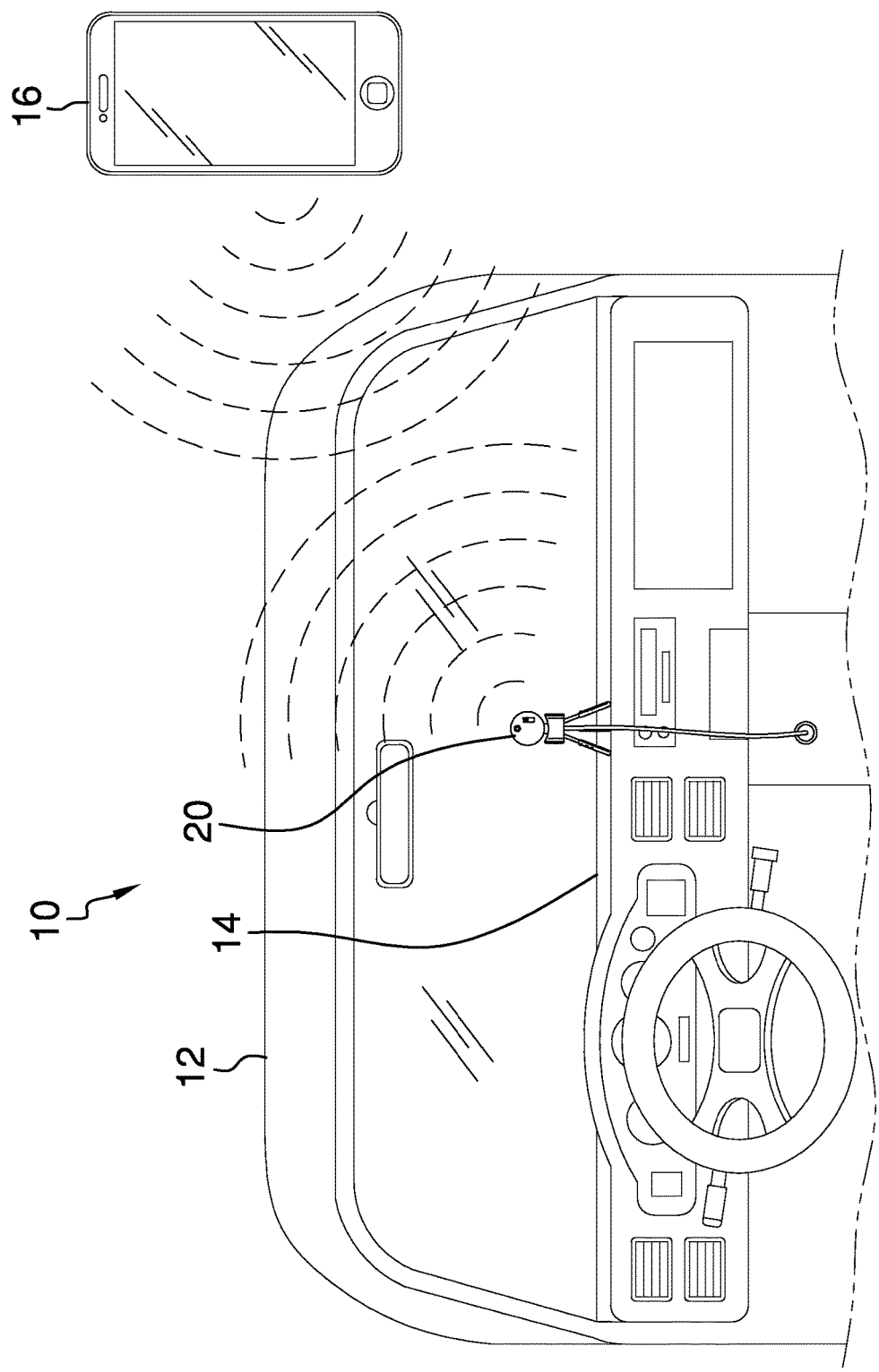
FIG. 5 is a perspective view of an embodiment of the disclosure.

With reference now to the drawings, and in particular to FIGS. 1 through 5 thereof, a new surveillance device embodying the principles and concepts of an embodiment of the disclosure and generally designated by the reference numeral 10 will be described.

As best illustrated in FIGS. 1 through 5, the video surveillance system 10 generally comprises a vehicle 12 that has a dashboard 14. The vehicle 12 may be a passenger vehicle or the like. An electronic device 16 is provided and the electronic device 16 may be carried. The electronic device 16 includes a receiver 18 and the receiver 18 may be a radio frequency receiver or the like. The electronic device 16 may comprise a smart phone or the like.

A recording unit 20 is positioned on the dashboard 14 and the recording unit 20 records video footage. The recording unit 20 is in electrical communication with the electronic device 16 such that the electronic device 16 receives the video footage. Thus, the video footage may be remotely viewed. The recording unit 20 rotates 360° such that the recording unit 20 records the video footage of all sides of the vehicle 12.

The recording unit 20 comprises a tripod 22 that has a housing 24 and a plurality of legs 26. The housing 24 has a top side 28 and a bottom side 30. Each of the legs 26 is coupled to and extends downwardly from the bottom side 30. Each of the legs 26 has a distal end 32 with respect to the bottom side 30. The distal end 32 of each of the legs 26 abuts the dashboard 14 such that the housing 24 is spaced from the dashboard 14.

Each of the legs 26 has a first section 34 that is slidably coupled to a second section 36 such that each of the legs 26 has a telescopically adjustable length. The second section 36 of each of the legs 26 has a plurality of apertures 38 extending therethrough. The apertures 38 on each of legs 26 are spaced apart from each other and distributed along the second section 36 of each of the legs 26. The first section 34 of each of the legs 26 has a lock 40 that is movably coupled thereto and the lock 40 on each of the legs 26 may be manipulated. The lock 40 on each of the legs 26 extends outwardly through a selected one of the apertures 38 in an associated one of the second sections 36 such that each of the legs 26 is retained at a selected length.

A processor 42 is positioned within the housing 24 and the processor 42 may comprise an electronic processor or the like. A transmitter 44 is positioned within the housing 24 and the transmitter 44 is electrically coupled to the processor 42. The transmitter 44 is in electrical communication with the electronic device 16. The transmitter 44 may be a radio frequency transmitter or the like.

A motor 46 is positioned within the housing 24 and the motor 46 is electrically coupled to the processor 42. A shaft 48 is rotatably coupled to the motor 46 such that the motor 46 rotates the shaft 48 when the motor 46 is turned on. The shaft 48 extends upwardly through the top side 28 of the housing 24. The shaft 48 has a distal end 50 with respect to the top side 28.

A power supply 52 is positioned within the housing 24 and the power supply 52 is electrically coupled to the processor 42. The power supply 52 comprises at least one battery 54. The power supply 52 may additionally include a power cord 56 extending outwardly from the housing 24. The power cord 56 has a distal end 58 with respect to the housing 24 and the distal end 58 has a plug 60 electrically coupled thereto. The plug 60 may be electrically coupled to the vehicle 12. The plug 60 may comprise a cigarette lighter adapter or the like.

A camera 62 is provided that has a first end 64, a second end 66 and an outer wall 68 extending between the first end 64 and the second end 66. The first end 64 is open such that first end 64 records the video footage. The outer wall 68 may be curved and the camera 62 may have a cylindrical shape. The camera 68 may comprise a digital video camera or the like.

The outer wall 68 is coupled to the distal end 50 of the shaft 48 such that the camera 62 is spaced from the top side 28 of the housing 24. The shaft 48 rotates the camera 62 three hundred sixty degrees when motor 46 is turned on. The camera 62 is electrically coupled to the processor 42 such that the transmitter 44 transmits the video footage to the electronic device 16. Thus, the video footage may be remotely viewed on the electronic device 16. A switch 70 is movably coupled to the second end 66 such that the switch 70 may be manipulated. The switch 70 is electrically coupled to the processor 42 such that the switch 70 selectively turns the motor 46 on and actuates the camera 62 to begin recording the video footage.

In use, the recording unit 20 is positioned on the dashboard 14 when the vehicle 12 is to be unattended. The switch 70 is manipulated to begin recording the video footage and to begin rotating the camera 62. The electronic device 16 receives the video footage and the electronic device 16 stores the video footage. The video footage may be viewed in real time or the video footage may be viewed at a later time. The video footage may be utilized as evidence of vandalism of the vehicle 12 or tampering of the vehicle 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A video surveillance system comprising: a vehicle having a dashboard;
   an electronic device being configured to be carried;
   and a recording unit being positioned on said dashboard, said recording unit recording video footage, said recording unit being in electrical communication with said electronic device such that said electronic device receives said video footage thereby facilitating said video footage to be remotely viewed, said recording unit rotating 360° such that said recording unit records said video footage of all sides of said vehicle, said recording unit including a tripod having a housing and a plurality of legs, said housing having a top side and a bottom side, each of said legs being coupled to and extending downwardly from said bottom side, each of said legs having a distal end with respect to said bottom side, each of said legs having a first section being slidably coupled to a second section such that each of said legs has a telescopically adjustable length, said distal end of each of said legs abutting said dashboard such that said housing is spaced from said dashboard;
   a processor positioned in said housing of said tripod, said processor being operationally coupled to said recording unit;
   and a power supply being electrically coupled to said processor, said power supply including a power cord electrically coupled to said processor, said power cord extending from said bottom side of said housing of said tripod between upper ends of said plurality of legs.

2. The system according to claim 1, wherein said second section of each of said legs has a plurality of apertures extending therethrough, said apertures on each of legs being spaced apart from each other and distributed along said second section of each of said legs.

3. The system according to claim 2, wherein said first section of each of said legs has a lock being movably coupled thereto wherein said lock on each of said legs is configured to be manipulated, said lock on each of said legs extending outwardly through a selected one of said apertures in an associated one of said second sections such that each of said legs is retained at a selected length.

4. The system according to claim 1, further comprising: a housing having a top side;
   And a rotation unit being positioned within said housing, said rotation unit comprising: said processor being positioned within said housing;
   and a transmitter being positioned within said housing, said transmitter being electrically coupled to said processor, said transmitter being in electrical communication with said electronic device.

5. The system according to claim 4, further comprising: a motor being positioned within said housing, said motor being electrically coupled to said processor;
   and a shaft being rotatably coupled to said motor such that said motor rotates said shaft when said motor is turned on, said shaft extending upwardly through said top side of said housing, said shaft having a distal end with respect to said top side.

6. The system according to claim 5, further comprising said recording unit including a camera having a first end, a second end and an outer wall extending between said first end and said second end, said first end being open such that first end records said video footage, said outer wall being coupled to said distal end of said shaft such that said camera is spaced from said top side of said housing.

7. The system according to claim 6, wherein said shaft rotates said camera 360° when motor is turned on, said camera being electrically coupled to said processor such that said transmitter transmits said video footage to said electronic device thereby facilitating said video footage to be remotely viewed.

8. The system according to claim 6, further comprising a switch being movably coupled to said second end wherein said switch is configured to be manipulated, said switch being electrically coupled to said processor such that said switch selectively turns said motor on.

9. A video surveillance system comprising: a vehicle having a dashboard;
   an electronic device being configured to be carried, said electronic device including a receiver;
   and a recording unit being positioned on said dashboard, said recording unit recording video footage, said recording unit being in electrical communication with said electronic device such that said electronic device receives said video footage thereby facilitating said video footage to be remotely viewed, said recording unit rotating 360° such that said recording unit records said video footage of all sides of said vehicle, said recording unit comprising: a tripod having a housing and a plurality of legs, said housing having a top side and a bottom side, each of said legs being coupled to and extending downwardly from said bottom side, each of said legs having a distal end with respect to said bottom side, each of said legs having a first section being slidably coupled to a second section such that each of said legs has a telescopically adjustable length, said distal end of each of said legs abutting said dashboard such that said housing is spaced from said dashboard, said second section of each of said legs having a plurality of apertures extending therethrough, said apertures on each of legs being spaced apart from each other and distributed along said second section of each of said legs, said first section of each of said legs having a lock being movably coupled thereto wherein said lock on each of said legs is configured to be manipulated, said lock on each of said legs extending outwardly through a selected one of said apertures in an associated one of said second sections such that each of said legs is retained at a selected length, a rotation unit being positioned within said housing, said rotation unit comprising: a processor being positioned within said housing, a transmitter being positioned within said housing, said transmitter being electrically coupled to said processor, said transmitter being in electrical communication with said receiver; a motor being positioned within said housing, said motor being electrically coupled to said processor, a shaft being rotatably coupled to said motor such that said motor rotates said shaft when said motor is turned on, said shaft extending upwardly through said top side of said housing, said shaft having a distal end with respect to said top side, and a power supply being positioned within said housing, said power supply being electrically coupled to said processor, said power supply comprising at least one battery, said power supply including a power cord electrically coupled to said processor, said power cord extending from said bottom side of said housing of said tripod between upper ends of said plurality of legs;

and a camera having a first end, a second end and an outer wall extending between said first end and said second end, said first end being open such that first end records said video footage, said outer wall being coupled to said distal end of said shaft such that said camera is spaced from said top side of said housing, said shaft rotating said camera 360° when motor is turned on, said camera being electrically coupled to said processor such that said transmitter transmits said video footage to said electronic device thereby facilitating said video footage to be remotely viewed, and a switch being movably coupled to said second end wherein said switch is configured to be manipulated, said switch being electrically coupled to said processor such that said switch selectively turns said motor on.

* * * * *